United States Patent [19]

Ganster et al.

[11] 4,423,200

[45] Dec. 27, 1983

[54] PROCESS FOR THE PRODUCTION OF POLYURETHANE UREA PRODUCTS

[75] Inventors: Otto Ganster, Leverkusen; James M. Barnes, Wermelskirchen, both of Fed. Rep. of Germany

[73] Assignee: Bayer Aktiengesellschaft, Leverkusen, Fed. Rep. of Germany

[21] Appl. No.: 452,575

[22] Filed: Dec. 23, 1982

[30] Foreign Application Priority Data

Jan. 9, 1982 [DE] Fed. Rep. of Germany ....... 3200412

[51] Int. Cl.$^3$ .................. C08G 18/79; C08G 18/32
[52] U.S. Cl. ................................ 528/67; 521/129; 521/160; 528/54; 528/61
[58] Field of Search .................. 528/61, 67; 521/160, 521/129

[56] References Cited

U.S. PATENT DOCUMENTS

| | | |
|---|---|---|
| 4,208,507 | 6/1980 | Stutz et al. ........................... 528/67 |
| 4,261,852 | 4/1981 | Carroll et al. ........................ 528/67 |
| 4,352,858 | 10/1982 | Stanley ............................... 528/67 |

FOREIGN PATENT DOCUMENTS 852651 10/1960 United Kingdom .

*Primary Examiner*—H. S. Cockeram
*Attorney, Agent, or Firm*—Gene Harsh; Joseph C. Gil

[57] ABSTRACT

This invention relates to a process for the production of polyurethane urea products from isocyanate product blends and preferably less reactive, aromatic diamines, or solutions of aromatic diamines in relatively high molecular weight polyhydroxyl compounds, the reaction components being reacted in a casting process with commercially-reasonable casting times and comparatively short demolding times. For this purpose, relatively high-molecular weight polyhydroxyl compounds, optionally in the presence of low molecular weight diols are reacted with excess quantities of toluene, phenylene or hexamethylene diisocyanate to produce a substantially diisocyanate-free NCO-prepolymer. This NCO-prepolymer is mixed with from 0.1 to 25%, by weight, of less reactive, monomeric tetra-alkyl-diphenylmethane diisocyanates corresponding to the general formula:

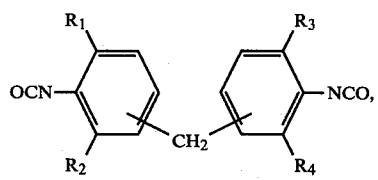

wherein $R_1$ to $R_4$, which may be the same or different, represent $C_1$–$C_4$ alkyl radicals.

These isocyanate blends may be easily processed into elastomer moldings having favorable properties in the casting process using moderately-reactive aromatic diamines from the series of di- to tetra-alkyl-diphenylmethane diamines and/or dialkyl-toluene diamines and/or using substituted 3,5-diamino-4-alkyl-benzoic acid alkyl esters, optionally dissolved in the relatively high molecular weight polyhydroxyl compounds.

9 Claims, No Drawings

PROCESS FOR THE PRODUCTION OF POLYURETHANE UREA PRODUCTS

This invention relates to a process for the production of polyurethane urea products, which may be either cellular or elastomeric, from NCO-prepolymers which have increased NCO contents, and aromatic diamines, or solutions thereof in relatively high molecular weight polyhydroxyl compounds. According to this process, the reaction components are reacted in a casting process employing favorably long casting times and comparatively short demolding times.

For this purpose, relatively high molecular weight polyhydroxyl compounds, optionally in the presence of low molecular weight diols, are reacted with excess quantities of toluene, phenylene or hexamethylene diisocyanate to produce a substantially diisocyanate-free NCO-prepolymer. Then, from 0.1 to 25%, by weight, of less reactive, monomeric tetra-alkyl-diphenylmethane diisocyanates, corresponding to the general formula:

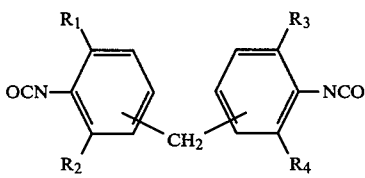

wherein $R_1$ to $R_4$, which may be the same or different, represent $C_1$-$C_4$ alkyl radicals, are mixed with this NCO-prepolymer in order to increase the NCO content.

These isocyanate blends may then be easily processed, with moderately reactive diamines from the series of di- to tetra-alkyl-diphenylmethane diamines, dialkyl-toluene diamines, and/or with 3,5-diamino-4-alkyl-benzoic acid alkyl esters or with solutions of these diamines in relatively high molecular weight polyhydroxyl compounds, into elastomer moldings having favorable properties using the known casting process employing favorable processing conditions. Aromatic diamines, without alkyl substituents in the vicinity of each amino group and without deactivating substituents, such as, for example, diphenylmethane-4,4'-diamine, may also be used, but must be in the form of solutions thereof in relatively high molecular weight polyhydroxyl compounds.

BACKGROUND OF THE INVENTION

Polyurethane elastomers are preferably produced, according to the known casting process from, for example, NCO-prepolymers with glycols as chain-lengthening agents. Particularly favorable properties are obtained using naphthylene diisocyanate or diphenylmethane diisocyanate with butane diol-1,4 (see Kunststoff-Handbuch, Vol. 7, Polyurethanes, Vieweg and Höchtlen, Carl-Hanser-Verlag, Munich, 1966, pages 207-227). In order to achieve a high hardness in the elastomers, the diisocyanate is reacted with the relatively high molecular weight polyhydroxyl compounds in NCO:OH ratios of greater than 2:1 to produce NCO-prepolymers which thus still contain portions of free diisocyanates, in addition to the NCO-prepolymers.

However, it has also been proposed to increase the NCO content of NCO-prepolymers, such as those based on toluene diisocyanate, by adding other, different diisocyanates and then to further react them with chain-lengthening agents (see Japanese Patent Application No. 53,133,298).

As the NCO content increases, the hardness of the elastomer increases, but the casting time of the reaction mixture is also reduced, and casting is practicable only with glycol-lengthening. With aromatic diamines as the chain-lengthening agents, elastomers having improved elastic and thermal properties are, indeed, generally accessible, but they have a higher reactivity. Consequently, the casting time is shortened in many cases to impracticably short times, unless diamines, such as 3,3'-dichloro-4,4'-diamino-diphenylmethane, which have considerably reduced reactivities (but, unfortunately, also high melting points), are used. Even with these diamines, however, the casting time is extremely short (particularly with NCO-enriched prepolymer mixtures) and partly as a result of this, the casting process cannot be carried out on a practical basis.

The reaction of conventional NCO-prepolymers with chain-lengthening agents, such as, for example, diethyltolamines, tetra-alkyl-4,4'-diamino-diphenylmethanes or 4-alkyl-3,5-diamino-benzoic acid alkyl esters, is also difficult because of similar short reactivities. Thus, processing with commercially available isocyanates, such as diphenylmethane diisocyanate or naphthylene diisocyanate, in the form of NCO-prepolymers, is only possible with very short, impracticable casting times (i.e., $\leq 5$ seconds). Large cast parts or comparatively long flow paths are, thus, hardly feasible (see, Example 4, Table 1, herein).

If reduction of the reactivity of these diamines is attempted by diluting them with relatively high molecular weight polyhydroxyl compounds (such as, for example, adipic acid/$C_2$-$C_6$-diol polyesters), the results are unsatisfactory. A slight increase in the casting time is indeed achieved, but this has to be balanced against a concurrent and disproportionate increase in the demolding time (see, Example 10, Table 2, herein).

It has now been found that NCO-prepolymers, based on toluene diisocyanate, phenylene diisocyanate or hexamethylene diisocyanate with polyester and/or polyether diols and blended with tetra-alkyl-diphenylmethane diisocyanate, then combined with liquid or low-melting aromatic diamines, may easily be processed into cast parts, even in high pressure installations. These diamines may be less reactive diamines used alone, or in the form of solutions of less reactive diamines in relatively high molecular weight polyhydroxyl compounds and/or, surprisingly, even in the form of solutions of reactive, aromatic diamines, such as diphenylmethane-4,4'-diamine, in relatively high molecular weight polyhydroxyl compounds. During processing, a gradual change in hardness may be obtained by varying the quantity of the added diisocyanates. Moreover, the casting times are long enough for large-volume parts to be produced (see Examples 5 to 9, Table 1 and Examples 11 to 13, Table 2, herein) and the parts may be released from the mold after relatively short molding times.

It is surprising that, in spite of the simultaneous use of different diisocyanates in the casting mixture, the mechanical properties of the end products, which are obtained according to the present invention, are outstanding. Normally, the mixing of several different isocyanate components in the polyurea system causes the production of different urea segments which interfere with each other and thus exert a negative influence on the mechanical property spectrum (particularly on the heat stability and the pressure deformation residue) of the end product. However, good values are actually found precisely in the critical characteristics of heat stability and pressure deformation residue in the products obtained according to the instant invention. The reactivity gradation, and thus the processibility, is also very favorably effected.

In contrast to high-melting diamines, such as 3,3'-dichloro-4,4'-diamino-diphenylmethane, which are slow to react, liquid or low-melting chain-lengthening diamines have a moderate reactivity. Examples of these low-melting diamines include diethyl-tolamines or the (liquid) mixtures thereof, or the mixed condensates from, for example, diethyl aniline, diisopropyl aniline and formaldehyde (such as tetra-alkyl-4,4'-diamino-diphenylmethane), which may be easily processed as diamine melts in high pressure installations.

Alkylated diphenylmethane diisocyanate compounds, and the use thereof in polyurethanes, have been known for a long time. Thus, British Pat. No. 852,651 describes the production of tetra-alkylated diphenylmethane diisocyanates and indicates the suitability thereof for the production of polyurethanes. However, experiments have now shown that formulations which are composed exclusively of tetra-alkyl-diphenylmethane diisocyanates produce waxy-brittle bodies during the reaction with aromatic diamines as chain-lengthening agent, which bodies may only be strengthened by an abnormally-long subsequent heating operation (see Table 1, Examples 1 and 2, herein). Due to this peculiarity, a commercial use of the resulting products is impossible, in spite of some useful mechanical properties.

In the method according to the present invention, the production of a brittle, waxy structure is not observed, in spite of the use of tetra-alkyl-diphenylmethane diisocyanate. On the contrary, moldings which have favorable properties are obtained with practicable casting times and short molding times.

DESCRIPTION OF THE INVENTION

Thus, the present invention provides a process for the production of polyurethane urea products, which may be either cellular or elastomeric, by the reaction of NCO-prepolymers and blended with quantities of certain monomeric polyisocyanates, with aromatic diamines, or with solutions of these diamines in relatively high molecular weight polyhydroxyl compounds, and optionally catalysts and conventional additives.

These substantially-linear NCO-prepolymers, which contain less than 0.2%, preferably less than 0.05%, unreacted monomeric diisocyanate (optionally by distilling off unreacted diisocyanates), are produced from substantially-linear relatively high molecular weight polyhydroxyl compounds which have a molecular weight of from 400 to 12,000, preferably of from 400 to 5000, to which, optionally, have been added low molecular weight diols which have a molecular weight of from 62 to 399, preferably of from 62 to 350, reacted with toluene diisocyanate, phenylene diisocyanate or hexamethylene diisocyanate, preferably toluene diisocyanate, in an NCO:OH ratio of greater than 1.1:1, preferably of from 1.1:1 to 2.5:1 and more preferably, of from 1.5:1 to 2.1:1. This NCO-prepolymer is then blended with from 0.1 to 25%, by weight, preferably from 0.5 to 20%, by weight, and more preferably, from 0.5 to 15%, by weight, of diphenylmethane diisocyanates which are tetra-alkyl-substituted in the o-positions to the NCO groups, which correspond to the general formula:

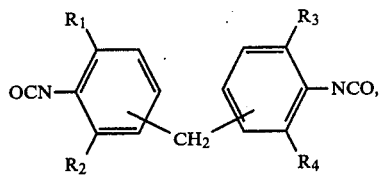

wherein $R_1$, $R_2$, $R_3$ and $R_4$, which may be the same or different represent straight- or branched-chain $C_1$-$C_4$ alkyl groups.

This blended product is then reacted with aromatic diamines, optionally dissolved in relatively high molecular weight polyhydroxyl compounds, said diamine selected:

(a) from the series of di- to tetra-alkyl-diphenyl diamines corresponding to the general formula:

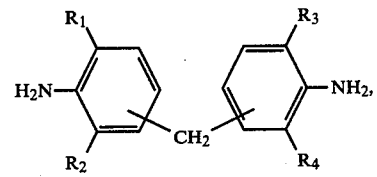

wherein
$R_1$ to $R_4$, which may be the same or different, represent straight- or branched-chain $C_1$-$C_4$ alkyl groups, and/or wherein
$R_2$ and/or $R_4$ may represent hydrogen; and/or (b) from the series of dialkyl-toluene diamines corresponding to the general formulae:

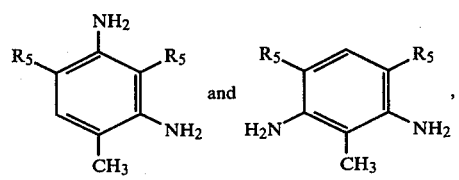

wherein $R_5$, which may be the same or different, represents straight- or branched-chain $C_1$-$C_5$ alkyl groups, preferably ethyl; and/or (c) from the 3,5-diamino-4-alkyl-benzoic acid alkylester series, corresponding to the general formula:

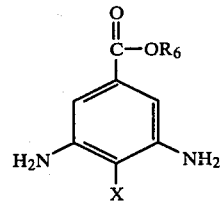

wherein
X represents a $C_1$-$C_{12}$ alkyl, preferably methyl, ethyl, isopropyl or isobutyl; and
$R_6$ represents straight- or branched-chain $C_1$-$C_{10}$ alkyl radicals; and/or (d) solutions of reactive aromatic diamines without alkyl groups in the vicinity of each amino group and without deactivating substituents, such as, preferably, diphenylmethane-4,4'-diamine, in relatively high-molecular weight polyhydroxyl compounds.

These diamines or diamine mixtures are used in substantially equivalent quantities ($NH_2:NCO$ or $OH+NH_2:NCO$ of from 0.8:1 to 1.2:1, preferably of from 0.9:1 to 1.05:1). Included among suitable substantially-linear polyols with molecular weights of from 400 to 12000, which preferably contain 2, optionally up to 3, Zerewitinoff-active H-groups, which are reactive against NCO-groups (substantially hydroxyl groups), are the known polyesters, polylactones, polyethers, polythioethers, polyesteramides, polycarbonates and polyacetals. Also, hydroxyl-terminated vinyl polymers, such as, for example, polybutadiene diols; polyhydroxyl compounds which contain urethane or urea groups; optionally modified natural polyols, and compounds containing other Zerewitinoff-active groups, such as amino, carboxyl or thiol groups may be used. These compounds correspond to the prior art and are described in detail, for example, in German Auslegeschriften Nos. 2,302,564; 2,423,764; 2,549,372 (U.S. Pat. No. 3,963,679); 2,402,840 (U.S. Pat. No. 3,984,607); 2,497,387 (U.S. Pat. No. 4,035,213) and, in particular, U.S. Pat. No. 2,854,384.

The preferred polyols according to the instant invention include polyesters containing hydroxyl groups, obtained from dihydricalcohols and adipic acid; polycarbonates; polycaprolactones; polyethylene oxide polyethers; polypropylene oxide polyethers; polytetrahydrofuran polyethers and mixed polyethers of ethylene oxide and propylene oxide and/or optionally tetrahydrofuran. Adipic acid diol ester, in particular, adipic acid/$C_2$-$C_6$ diol polyester, caprolactone polyester or polycarbonate diols, in particular, hexane diol polycarbonates, which are optionally modified by co-components, are particularly preferred. However, mixtures of the relatively high molecular weight compounds containing hydroxyl groups may also be used.

Preferred low molecular weight diols, optionally to be used simultaneously, include ethylene glycol, di- and triethylene glycol, and, in particular, 1,6-hexane diol, neopentyl glycol, 2-methyl-propane diol and hydroquinone-di-$\beta$-hydroxyethyl ether. In most cases, 1,4-butane diol is most preferable.

As described, toluene diisocyanates, phenylene diisocyanate and hexamethylene diisocyanate are particularly preferred as diisocyanates, due to the ease of distillation thereof. Toluene diisocyanates, in conventional isomer mixtures, are particularly preferred, and toluene-2,4-diisocyanate is most particularly preferred.

The NCO-prepolymers are formed by reacting the relatively high molecular weight polyhydroxyl compounds with excess quantities ($\geq$1.1:1 NCO:OH) of diisocyanates. The low molecular weight diols may optionally be used as chain-lengthening agents in admixture with the relatively high molecular weight polyhydroxyl compounds, or they may be added subsequently to the formation of the NCO-prepolymer.

The quantity of diisocyanates which is used is preferably from 1.5 to 2.5, and most preferably from 1.5 to 2.1, NCO equivalents per OH equivalent. During the production of the NCO-prepolymers, it is possible to use a very much higher NCO:OH ratio (for example, up to 10.0:1), but the content of free diisocyanates of the type mentioned must then be removed again by distillation in order that the effective NCO:OH ratios specified are observed. It is even preferred initially to carry out the NCO-prepolymer formation using a very great NCO excess, approaching the ideal NCO:OH ratio of 2:1, in order to limit the linking of two relatively high molecular weight polyhydroxyl compounds. After unreacted diisocyanates have been distilled off, for example, in a thin-film evaporator, a substantially monomer-free NCO-prepolymer which contains less than 0.2%, by weight, more preferably less than 0.05%, by weight, of monomeric diisocyanate, should remain.

The NCO content of this substantially monomeric-free NCO-prepolymer is blended with 0.1 to 25%, by weight, preferably from 0.5 to 20%, by weight, and more preferably from 0.5 to 15%, by weight, diphenylmethane diisocyanates which are tetra-alkyl-substituted in o-positions to the NCO groups and which correspond to the general formula:

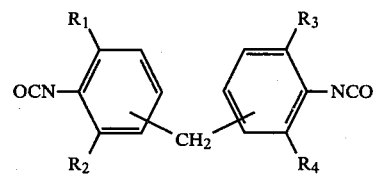

In this general formula for these tetra-alkyl-diphenylmethane diisocyanates, $R_1$, $R_2$, $R_3$ and $R_4$ represent the same or different alkyl radicals having from 1 to 4 carbon atoms, such as, for example, methyl, ethyl, n-propyl, isopropyl, n-butyl, isobutyl or t-butyl groups. Mixtures of such individual compounds with any radicals $R_1$ to $R_4$ may also be used.

Suitable diisocyanates for blending with the NCO-prepolymers include the tetramethyl, tetraethyl, tetrapropyl, tetraisopropyl, tetra-n-butyl, tetraisobutyl and/or tetra-t-butyl derivatives of diphenylmethane diisocyanates, in particular, 4,4'-diisocyanates. However, the derivatives having asymmetric alkyl substitution on the two phenyl nuclei are also suitable. Such derivatives include, for example, 3,5-diethyl-3',5'-diisopropyl-diphenylmethane-4,4'-diisocyanate, 3,5-diethyl-3',5'-diisobutyl-diphenylmethane-4,4'-diisocyanate or other asymmetrically-substituted tetra-alkyl-diphenylmethane diisocyanates, which are produced by the condensation of differently alkyl-substituted dialkyl anilines with formaldehyde and subsequent phosgenation. Product mixtures comprising asymmetrically-substituted tetra-alkyl-diphenylmethane diisocyanates mixed with its symmetrical components are particularly preferred. Examples of these preferred mixtures include mixtures of, for example, from 45 to 65%, by weight, of 3,5-diethyl-3', 5'-diisopropyl-diphenylmethane-4,4'-diisocyanate and from 27.5 to 17.5%, by weight, of 3,5,3', 5'-tetraethyl-diphenylmethane-4,4'-diisocyanate and from 27.5 to 17.5%, by weight, of 3,5,3',5'-tetra-isopropyl-diphenylmethane-4,4'-diisocyanate. The production of asymmetrically-substituted alkyl-diphenylmethane diamines which may be phosgenated into the corresponding isocyanates is described, for example, in German Auslegeschrift No. 2,920,501.

The resulting isocyanate blends of NCO-prepolymer with tetra-alkyl-diphenylmethane diisocyanates, should preferably contain at least 4%, by weight, of NCO, preferably from 4 to 9%, by weight, and more preferably from 4 to 7%, by weight, of NCO.

In the production of these isocyanate blends, minor quantities, generally less than 5 mol percent of higher functional compounds, for example, trifunctional compounds, may optionally be used in each of the starting materials, but the quantity must be restricted such that the properties are not substantially modified and merely the molecular weight is affected. In the alternative, monofunctional compounds (monofunctional hydroxy compounds, monofunctional isocyanates or monofunctional amines) may optionally be simultaneously used as chain-terminators to control the molecular weight.

Of course, the conventional hydrolysis and oxidation stabilizers may also be added to the starting compounds. It is advisable to add anti-oxidants for stabilizing the polyurethane, such anti-oxidants being sterically-hindered phenols, organic phosphites and/or phosphonites, and/or conventional UV absorbers and light protecting agents based on benzotriazole, 2,2,6,6-tetramethylpiperidine, 1,2,2,6,6-pentamethylpiperidine or benzophenone, and/or other types of UV absorbers. Other additives, pigments, dyes or reinforcing fibers may also be admixed according to the prior art.

The isocyanate blends are lengthened according to the present invention using aromatic diamines, optionally dissolved in relatively high molecular weight polyhydroxyl compounds and/or using solutions of reactive aromatic diamines in relatively high molecular weight polyhydroxyl compounds.

The preferred aromatic diamines from the series of di- to tetra-alkyl-diphenylmethane diamines correspond to the general formula:

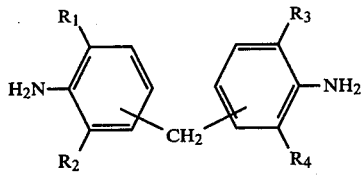

wherein
$R_1$ to $R_4$, which may be the same or different, represent straight- or branched-chain aliphatic alkyl radicals having from 1 to 4 carbon atoms, and/or wherein $R_2$ and/or $R_4$ may represent hydrogen.

Examples of such diamines include tetramethyl-, tetraethyl-, tetrapropyl-, tetraisopropyl-, tetrabutyl-, tetraisobutyl- and/or, optionally, tetra-t-butyl-diphenylmethane-4,4'-diamines, with asymmetrically-alkyl-substituted tetra-alkyl-diphenylmethane diamines prepared from differently-substituted dialkyl anilines and formaldehyde preferred. Examples of such preferred diamines include 3,5-diethyl-3',5'-diisopropyl-diphenylmethane-4,4'-diamine, 3,5-dimethyl-3',5'-diisobutyl-diphenylmethane-4,4'-diamine, 3,5-dimethyl-3',5'-diisopropyl-diphenylmethane diamine, and mixtures of the asymmetrically-substituted and symmetrically-substituted tetra-alkyl-diphenylmethanes. The production of such asymmetrically-substituted tetra-alkyl-diphenylmethane diamines and of the mixtures thereof with symmetrically-substituted tetra-alkyl-diphenylmethane diamines is described, for example, in German Auslegeschrift No. 2,920,501.

Trialkyl-substituted diphenylmethane diamines, such as, for example, 3,5,3'-triisopropyl-diphenylmethane-4,4'-diamine and 3,5-diisopropyl-3'-ethyl-diphenylmethane-4,4'-diamine may also be used. Dialkyl-diphenylmethane diamines, such as 3,3'-diisopropyl-diphenylmethane-4,4'-diamine, may also be used, but are less preferred. However, mixtures of from about 45 to 65%, by weight, of 3,5-diethyl-3',5'-diisopropyl-diphenylmethane-4,4'-diamine, from 27.5 to 17.5%, by weight, of 3,5,3',5'-tetraethyl-diphenylmethane-4,4'-diamine, and from 27.5 to 17.5%, by weight, of 3,5,3',5'-tetraisopropyl-diphenylmethane-4,4'-diamine are particularly preferred.

Another preferred group of aromatic diamines include dialkyl-toluene diamines and the isomeric mixtures thereof. Examples of these diamines include 1-methyl-3,5-diisopropyl-2,4-diaminobenzene, 1-methyl-3,5-diisopropyl-2,6-diaminobenzene, and preferably 1-methyl-3,5-diethyl-2,4-diaminobenzene and 1-methyl-2,5-diethyl-2,6-diaminobenzene and mixtures thereof, preferably in ratios of from 8:20 to 40:60.

Additional diamines which may be used include those of the 3,5-diamino-4-alkyl-benzoic acid alkyl ester series which correspond to the formula:

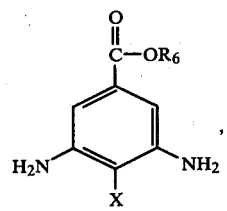

wherein
X represents $C_1$–$C_{12}$ alkyl, preferably methyl, ethyl, isopropyl or isobutyl, and
$R_6$ represents straight- or branched-chain $C_1$–$C_{10}$ alkyl radicals, such as methyl, ethyl, propyl, isopropyl, butyl, isobutyl, t-butyl, amyl, isoamyl, n-hexyl, n-octyl, n-decyl or 2-ethylhexyl radicals.

The members in which $X=CH_3$ and $R=$isopropyl, isobutyl or 2-ethylhexyl are particularly preferred.

The above-described diamines are to be used alone or in admixture with relatively high-molecular weight, substantially-linear polyhydroxyl compounds having molecular weights of from 400 to 12,000, preferably of from 400 to 5000. All the polyols which have already been listed in connection with the preparation of the NCO-prepolymers are included as relatively high-molecular weight polyhydroxyl compounds. Adipic acid/$C_2$–$C_6$ diol polyesters are again preferred according to the present invention.

As suitable reactive aromatic diamines, the toluene diamines and isomer mixtures thereof, and particularly, the 4,4'-, 2,4'- and/or 2,2'-diphenylmethane diamines (and isomer mixtures thereof), in the form of from 3 to 70%, by weight, preferably from 5 to 40%, by weight, and more preferably, from 10 to 35%, by weight, solutions thereof in relatively high-molecular weight polyhydroxyl compounds, may also be used according to the present invention. However, processing difficulties are encountered when reactive aromatic diamines, such as diphenylmethane-4,4'-diamine, are used alone.

The NCO-prepolymers and the aromatic diamines are mixed according to known processes, for example, by metered mixing in chambers equipped with stirrers or by high pressure injection mixing in known elastomer casting machines.

EXAMPLES

The same apparatus and the same operational conditions for casting were used in all the Examples and Comparative Examples.

Equipment:

Toothed-weel metering pump and mixing head equipped with a 5000 r.p.m. spiked stirrer.

Processing temperatures:

| | | |
|---|---|---|
| NCO-prepolymer | 80° C. | Both components were metered and mixed in an NCO/(OH+)NH₂-ratio as given in the examples. The reaction mixture is cast in open molds (test panels). |
| Chain extender (diamine etc.) | 80° C. | |

EXAMPLES 1 AND 2

(Not According to the Present Invention)

Show the lower quality and the poor solidification behavior of the elastomers which were prepared using only tetra-alkyl-diphenylmethane diisocyanates as the isocyanate component (see Table 1).

EXAMPLE 1 (Comparative)

Synthesis of the NCO-prepolymer 2000 g of an adipic acid ethylene glycol polyester diol having a molecular weight of 2000 are reacted with 832 g of a tetra-alkyl-diphenylmethane diisocyanate mixture consisting of:

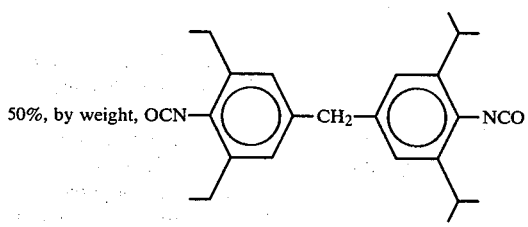

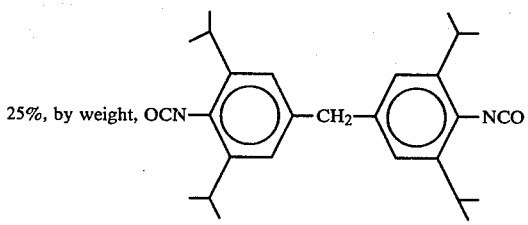

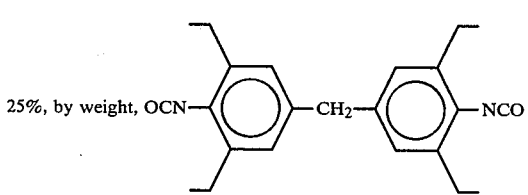

to produce an NCO-prepolymer containing 3.4%, by weight, of NCO.

Preparation of the Elastomer

A hot melt at about 60° C. of a chain-lengthening agent consisting of:

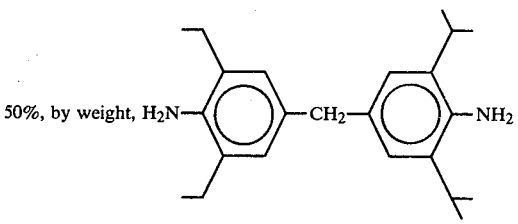

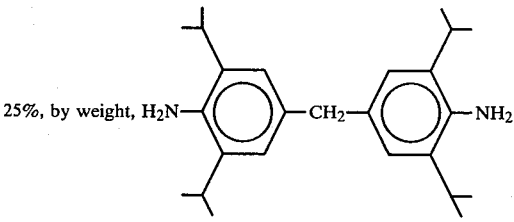

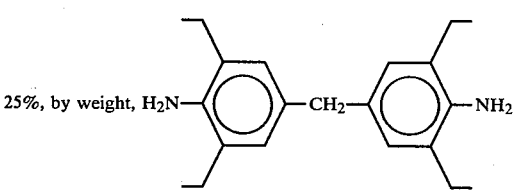

is metered into the mixing head with the NCO-prepolymer and the reaction takes place in an NCO:NH₂ ratio of 1.05:1. A product is obtained which is still of such a waxy and brittle nature, even after being heated for 10 hours at 100° C., that a mechanical test could not be performed on the elastomer.

EXAMPLE 2

(Comparative)

1500 g of a polypropylene oxide ether diol of molecular weight 1500 are reacted with 820 g of the tetra-alkyl-diphenylmethane diisocyanate mixture according to Example 1 to produce an NCO-prepolymer containing 3.7%, by weight, of NCO. The reaction between the NCO-prepolymer and the chain-lengthening agent according to Example 1 takes place in an NCO:NH₂ ratio of 1.05:1. The resulting elastomers are still of a waxy brittle nature after 2 hours at 100° C., and exhibit only moderate properties.

EXAMPLES 3 TO 9

(Examples 3 and 4 Not According to the Present Invention)

(Examples 5-9 According to the Present Invention)

These Examples demonstrate the advantage of the blending operation with tetra-alkyl-diisocyanato-diphenylmethane and the use of different chain-lengthening agents (Table 1).

The base prepolymer used is prepared by reacting one mol of a polyester diol of adipic acid and ethylene glycol having a molecular weight of 2000 with 2 mols of 2,4-toluene diisocyanate to produce an NCO-prepolymer containing 3.5%, by weight, of NCO.

EXAMPLE 3

(Comparative)

The base prepolymer is cast with the chain-lengthening diamine mixture of Example 1 in a ratio of NCO:NH$_2$ of 1.05:1. Heating time of the cast elastomer=10 hours at 80° C.

EXAMPLE 4

(Comparative)

To the base prepolymer is added an isocyanate mixture to give a total NCO content of 4.5%. The isocyanate mixture comprises 40%, by weight, of 4,4'-diisocyanato-diphenylmethane and 60%, by weight, of 2,4'-diisocyanato-diphenylmethane. Processing takes place using the chain-lengthening diamine of Example 1 with an NCO:NH$_2$ ratio of 1.05:1. The moldings are heated for 10 hours at 80° C.

EXAMPLE 5

To the base prepolymer is added an isocyanate mixture to give an NCO content of 4.7%, by weight. The isocyanate mixture is the tetra-alkyl-diphenylmethane diisocyanate mixture corresponding to the mixture of Example 1. The diamine mixture according to Example 1 is used as the chain-lengthening agent in an NCO:NH$_2$ ratio of 1.05:1 and the molding is subsequently heated for 10 hours at 80° C.

EXAMPLES 6 TO 9

To the base prepolymer is added an isocyanate to give an NCO content of 4.5%. The isocyanate added is 3,3',5,5'-tetraethyl-4,4'-diisocyanato-diphenylmethane. This blend is reacted with the following chain-lengthening agents in an NCO:NH$_2$ ratio of 1.05:1.

EXAMPLE 6

Diamine Mixture of Example 1

EXAMPLE 7

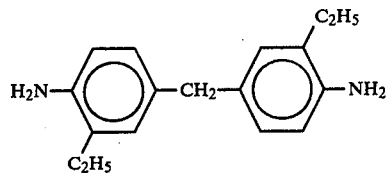

EXAMPLE 8

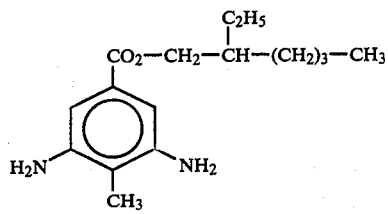

EXAMPLE 9

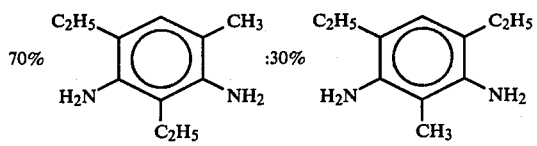

The moldings are subsequently heated for 10 hours at 80° C. The casting time (pot life) in these Examples in relatively short (Example 3) or is extremely short when the blending operation is carried out using diphenylmethane diisocyanate mixtures (Example 4). In contrast thereto, the casting time, when the diisocyanates according to the present invention are used, is sufficiently long without impairing the solidification times. The elastomers produced exhibit a good strength and good elongation, a good elasticity and a very good tear propagation resistance.

TABLE 1

| Example No. | | 2 | 3 | 4 | 5 | 6 | 7 | 8 | 9 |
|---|---|---|---|---|---|---|---|---|---|
| Hardness | Shore D | 36 | 35 | 42 | 43 | 41 | 37 | 33 | 38 |
| Tensile Test | | | | | | | | | |
| $\sigma_{100}$ | (MPa) | 5.96 | 6.63 | 7.50 | 8.67 | 8.05 | 7.87 | 6.28 | 7.56 |
| $\sigma_{300}$ | (MPa) | 8.57 | 12.6 | 14.0 | 12.7 | 11.0 | 10.7 | 8.09 | 10.9 |
| $\sigma_B$ | (MPa) | 15.5 | 58.3 | 51.7 | 54.9 | 51.9 | 47.9 | 43.6 | 57.7 |
| $\epsilon_R$ | % | 506 | 535 | 514 | 580 | 562 | 546 | 622 | 566 |
| Tear propagation resistance | (KN/m) | — | 50 | 65.3 | 79 | 68 | 71.1 | 60.3 | 73.0 |
| Rebound elasticity | (%) | 40 | 41 | 41 | 40 | 42 | 42 | 43 | 44 |
| Compression set | | | | | | | | | |
| (24 h/70° C.) | (%) | 43 | 42 | 42 | 58 | 50 | 45 | 50 | 54 |
| Abrasion (1 kp/40 m) | (mm$^3$) | 190 | 53 | 49 | 51 | 46 | 47 | 56 | 35 |
| Dyn. shear modulus (20° C.) | (MPa) | 32.6 | — | 37.2 | 43.3 | — | — | — | — |
| Tan δ (20° C.) | | — | 0.069 | — | 0.092 | 0.089 | — | — | — |
| T$_{tan}$ δ Max. | (°C.) | −30 | — | −23 | −23 | — | — | — | — |
| T$_{tan}$ δ Min. | (°C.) | +110 | — | +110 | +120 | — | — | — | — |
| Casting time | (sec) | 35" | 20" | <5" | 30" | 45" | 25" | 55" | 40" |

TABLE 1-continued

| Example No. | | 2 | 3 | 4 | 5 | 6 | 7 | 8 | 9 |
|---|---|---|---|---|---|---|---|---|---|
| Solidification | (min) | 120' | 10' | 8' | 5' | 8' | 3' | 9' | 5' |

No values were measured for the material according to Example 1, as the material did not solidify.

The DIN test numbers were: Hardness - 53505; Tension tests - 53504; Tear propagation resistance - 53515; Impact elasticity - 53512; Pressure deformation - 53517; Abrasion - 53516; Dyn. shear modulus - 53445; Tan δ - 53445.

EXAMPLES 10 TO 13

These Examples show the effect of the blending operation using tetraethyl-4,4'-diisocyanato-diphenylmethane, and the use of solutions of the chain-lengthening diamines in a relatively high molecular weight polyhydroxyl compound (Table 2) in the casting process.

Base prepolymer:

Adipic acid polyester diol of molecular weight 2000 based on butane diol-4,4/ethylene glycol (diol mol ratio 1:1).

Toluene diisocyanate isomer mixture (65%, 2,4-isomer+35% 2,6-isomer).

mol ratio of toluene diisocyanate:polyester=2.0:1.

NCO content of NCO-prepolymer=3.5%.

EXAMPLE 10

(Comparative)

To the base prepolymer is added diisocyanato-diphenylmethane (60% 4,4'-isomer+40% 2,4'-isomer) to yield an NCO content of 4.5%.

Chain-lengthening (casting) is carried out using a mixture of:

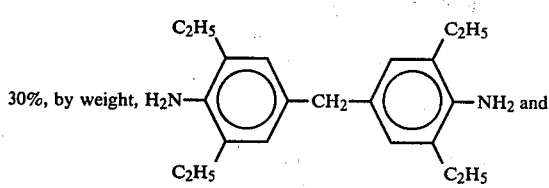

30%, by weight,

70%, by weight, of the polyadipate used in the base prepolymer.

NCO:OH+NH$_2$ ratio=1.05:1.

After-heating of the elastomer: 10 hours at 80° C.

EXAMPLES 11 TO 13

To the base prepolymer is added 3,3',5,5'-tetraethyl-4,4'-diisocyanato-diphenylmethane to give an NCO content of 4.5%. This blend is processed with solutions of 30 parts, by weight, of diamine in 70 parts, by weight, of the polyadipate used for the prepolymer in an NCO:OH+NH$_2$ ratio of 1.05:1. These diamine solutions contained diaza-bicyclo-octane as catalyst. The following diamines were used:

EXAMPLE 11

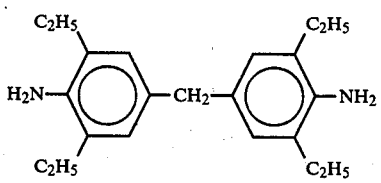

Catalysis: 0.3%, by weight, of diazabicyclo-octane, calculated on the diamine solution.

EXAMPLE 12

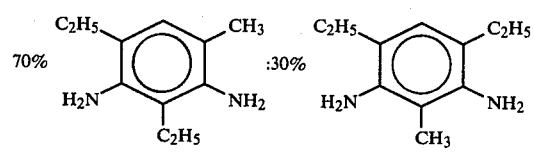

70%  :30%

Catalysis: 0.3%, by weight, of diazabicyclo-octane, calculated on the diamine solution.

EXAMPLE 13

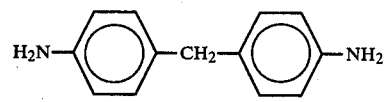

Catalysis: 0.15%, by weight, of diazabicyclo-octane, calculated on the diamine solution.

After-heating conditions in Examples 11 to 13: 10 hours at 80° C.

Comparative Example 10 provides a very long consolidation time with a very short casting time. In Examples 11 and 12, very fast consolidation times are achieved with a favorable casting time. Example 13 shows that, according to the present invention, reactive amines, such as 4,4'-diamino-diphenylmethane, in the form of the solutions thereof in relatively high molecular weight polyhydroxyl compounds may also be processed.

EXAMPLES 14 AND 15

These Examples show that the effect of the blending operation with tetra-alkyl-4,4'-diisocyanato-diphenylmethane is still maintained into higher NCO contents (Table 2).

Base prepolymer:

Polypropylene glycol of molecular weight 1500 is reacted with toluene diisocyanate (65% 2,4-isomer+35% 2,6-isomer) to produce an NCO-prepolymer containing 47% of NCO.

EXAMPLE 14

(Comparative)

To the base prepolymer is added diphenylmethane diisocyanate (60% 4,4'-isomer+40% 2,4'-isomer) to a resulting NCO content of 6.0%.

The chain-lengthening diamine mixture according to Example 1 is then added to the prepolymer in an NCO:NH$_2$ ratio of 1.05:1.

EXAMPLE 15

To the base prepolymer is added 3,3',5,5'-tetraethyl-4,4'-diisocyanato-diphenylmethane to give an NCO content of 6.0%.

The diamine mixture of Example 1 is then added to the prepolymer in an NCO:NH$_2$ ratio of 1.05:1. After-heating conditions in both Examples: 10 hours at 80° C.

Comparative Example 14 clearly shows shorter, impracticable casting times. On the other hand, there are obvious processing advantages of Example 15 which is according to the present invention.

TABLE 2

| Example No. | | 10 | 11 | 12 | 13 | 14 | 15 |
|---|---|---|---|---|---|---|---|
| Hardness | Shore A | 83 | 86 | 81 | 70 | 47 | 46 |
| Tensile test | | | | | | | |
| $\sigma_{100}$ | MPa | 4.27 | 5.60 | 4.62 | 2.51 | 12.3 | 12.0 |
| $\sigma_{300}$ | MPa | 6.72 | 8.07 | 6.50 | 3.86 | 22.8 | 25.0 |
| $\sigma_B$ | MPa | 39.3 | 49.9 | 52.4 | 34.5 | 31.7 | 35.0 |
| $\epsilon_R$ | % | 662 | 557 | 612 | 692 | 361 | 357 |
| Tear propagation resistance | KN/m | 53.5 | 41.5 | 37.9 | 25.0 | 63.0 | 70.5 |
| Rebound elasticity | % | 45 | 48 | 49 | 36 | 42 | 43 |
| Compression set | | | | | | | |
| (24h/70° C.) | % | 42.4 | 40.3 | 45.7 | 43.5 | — | — |
| Abrasion (1 kp/40 m) | mm$^3$ | 64 | 43 | 53 | 58 | 64 | 65 |
| Dyn. shear modulus (20° C.) | MPa | — | 17.8 | — | 17.6 | — | — |
| Tan δ (20° C.) | — | — | 0.061 | — | 0.12 | — | — |
| T$_{tan\,\delta}$ max | °C. | — | −30 | — | −23 | — | — |
| T$_{tan\,\delta}$ min | °C. | — | +110 | — | +120 | — | — |
| Casting time | sec | 8–10″ | 20″ | 20″ | 20″ | <5″* | 25″ |
| Solidification | min | 30′ | 9′ | <1′ | <1′ | 4.5′ | 3.5′ |

*complications in casting

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethane urea products by reacting
   (A) an isocyanate blend comprising
      (a) an NCO-prepolymer which is substantially monomer-free and which is produced by reacting substantially linear, relatively high molecular weight polyhydroxyl compounds which have molecular weights of from 440 to 12,000, with toluene diisocyanate, phenylene diisocyanate, hexamethylene diisocyanate or a combination of these diisocyanates, in an NCO:OH ratio of greater than 1.1:1, and
      (b) from 0.1 to 25%, by weight, of diphenylmethane diisocyanates which are tetra-alkyl-substituted in o-positions to the NCO-groups which correspond to the general formula:

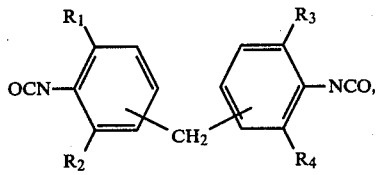

wherein
   R$_1$, R$_2$, R$_3$ and R$_4$, which may be the same or different represent straight- or branched-chain alkyl radicals having from 1 to 4 carbon atoms, with
   (B) chain-lengthening aromatic diamines in quantities of from 0.8:1 to 1.2:1 of isocyanate to isocyanate-reactive groups to prepare said polyurethane urea products.

2. A process according to claim 1, characterized in that the chain-lengthening aromatic diamines comprise diamines taken from the group consisting of members from the series of di- to tetra-alkyl-diphenylmethane diamines corresponding to the general formula:

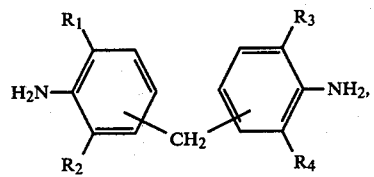

wherein
R$_1$ to R$_4$ are as defined in claim 1, and wherein
R$_2$ and R$_4$ may also represent H;
members from the series of dialkyl-toluene diamines corresponding to the general formulae:

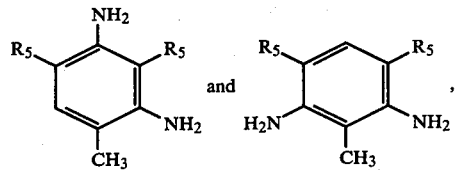

wherein
R$_5$, which may be the same or different, represents straight- or branched-chain C$_1$–C$_4$ alkyl radicals; members from the series of aromatic diamines of 3,5-diamino-4-alkyl-benzoic acid alkyl esters corresponding to the general formula:

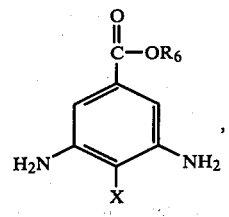

wherein

X represents $C_1$–$C_{12}$ alkyl, and $R_6$ represents straight- or branched-chain $C_1$–$C_{10}$ alkyl radicals;

solutions of reactive aromatic diamines without alkyl groups in the vicinity of each amino group and without deactivating substituents, dissolved in relatively high molecular weight polyhydroxyl compounds; and combinations of these diamines.

3. A process according to claim 2, characterized in that the chain-lengthening diamines are dissolved in polyhydroxyl compounds which have molecular weights of from 400 to 12,000.

4. A process according to claim 1, characterized in that catalysts and other known additives are used in preparing the elastomers.

5. A process according to claim 1, characterized in that said isocyanate blend comprises (a) a substantially monomer-free NCO-prepolymer produced from substantially linear, relatively high molecular weight polyhydroxyl compounds having a molecular weight of from 400 to 6000, and toluene diisocyanate in an NCO:OH ratio of from 1.1:1 to 2.1:1 and (b) from 0.1 to 25%, by weight, of diphenylmethane diisocyanates which are tetra-alkyl-substituted in o-positions to the NCO groups, said blend containing from 4 to 8%, by weight, of NCO groups.

6. A process according to claim 1, characterized in that diols having a molecular weight of from 62 to 399 are combined with the relatively high molecular weight polyhydroxyl compounds for preparing the NCO-prepolymer.

7. A process according to claim 1, characterized in that a product mixture of from 45 to 65%, by weight, of 3,5-diethyl-3′,5′-diisopropyl-diphenylmethane-4,4′-diisocyanate, from 17.5 to 27.5%, by weight, of 3,5,3′,5′-tetraethyl-diphenylmethane-4,4′-diisocyanate, and from 17.5 to 27.5%, by weight, of 3,5,3′,5′-tetraisopropyl-diphenylmethane-4,4′-diisocyanate is used as the diphenylmethane diisocyanates which are tetra-alkyl-substituted in the o-position to the NCO groups.

8. A process according to claim 2, characterized in that the isocyanate blend is reacted with chain-lengthening aromatic diamines from the series of tetra-alkyl-diphenylmethane diamines and dialkyl-substituted toluene diamines, wherein, $R_1$ to $R_4$ represent ethyl and isopropyl groups and $R_5$ represents ethyl and isopropyl groups in the formulae.

9. A process according to claim 3, characterized in that solutions of diphenylmethane diamines in relatively high molecular weight polyhydroxyl compounds are used as the chain-lengthening diamines.

* * * * *